United States Patent
Bugenhagen (10) Patent No.: US 8,593,962 B2
(45) Date of Patent: Nov. 26, 2013

(54) SYSTEM AND METHOD FOR TRACKING MAXIMUM THROUGHPUT AND SLA COMPLIANCE

(75) Inventor: Michael K. Bugenhagen, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 614 days.

(21) Appl. No.: 12/641,196

(22) Filed: Dec. 17, 2009

(65) Prior Publication Data

US 2010/0157804 A1 Jun. 24, 2010

Related U.S. Application Data (63) Continuation-in-part of application No. 12/381,673, filed on Mar. 12, 2009, now Pat. No. 7,983,189, and a continuation-in-part of application No. 12/412,141, filed on Mar. 26, 2009, now Pat. No. 7,978,628, and a continuation-in-part of application No. 12/412,127, filed on Mar. 26, 2009, and a continuation-in-part of application No. 12/421,525, filed on Apr. 9, 2009, now Pat. No. 8,068,425.

(60) Provisional application No. 61/138,471, filed on Dec. 17, 2008.

(51) Int. Cl.
*H04L 12/26* (2006.01)

(52) U.S. Cl.
USPC .................. 370/232; 370/236; 370/252

(58) Field of Classification Search
USPC ............................... 370/232, 236, 252
See application file for complete search history.

(56) References Cited

U.S. PATENT DOCUMENTS

| | | | |
|---|---|---|---|
| 5,867,483 A | 2/1999 | Ennis et al. | |
| 7,577,736 B1 * | 8/2009 | Ovenden | 709/224 |
| 2005/0073952 A1 | 4/2005 | Champlin et al. | |
| 2005/0180426 A1 * | 8/2005 | Sakata et al. | 370/395.2 |
| 2007/0067130 A1 * | 3/2007 | Toda et al. | 702/108 |
| 2009/0245224 A1 * | 10/2009 | Iyer et al. | 370/345 |

* cited by examiner

*Primary Examiner* — Jason Mattis
(74) *Attorney, Agent, or Firm* — Patton Boggs LLP (57) ABSTRACT

A system and method for controlling maximum throughput for communications. A frame size of each packet communicated to a UNI is determined. A maximum throughput is determined in response to the determined frame size of each packet communicated to the UNI. Frames per second are measured at the UNI. An amount of loss at the UNI is determined. A message indicating the maximum throughput, the amount of loss, and the frames per second is communicated in response to determining there is loss.

20 Claims, 9 Drawing Sheets

| Frames Size | Frames Size Calculations | | | | | FE calculations | | | | Gig-E calculations | | |
|---|---|---|---|---|---|---|---|---|---|---|---|---|
| | L2 Frame Size (bytes) | L2 Frame Size (Bits) | IPG (bits) | Preamble (bits) | Total bits per Frame including IPG & Preamble | FE Nominal phy throughput (megs) | FE Frames per Second | FE L2 Max throughput per frame size (Megs) | Percentage of maximum bandwidth available | Gig-E Nominal phy throughput (megs) | Gig-E Frames per Second | Gig-E L2 Max through put per frame size (Megs) |
| Smallest | 64 | 512 | 96 | 64 | 672 | 100 | 148,809 | 76.19021 | 76.162 | 1,000 | 1,488,095 | 761.9 |
| | 128 | 1,024 | 97 | 64 | 1,185 | 100 | 84,388 | 86.41331 | 86.469 | 1,001 | 844,725 | 865.0 |
| | 256 | 2,048 | 98 | 64 | 2,210 | 100 | 45,248 | 92.66790 | 92.731 | 1,002 | 453,393 | 928.5 |
| | 512 | 4,096 | 99 | 64 | 4,259 | 100 | 23,479 | 96.16998 | 96.214 | 1,003 | 235,501 | 964.6 |
| Average ? | 986 | 7,888 | 96 | 64 | 8,048 | 100 | 12,425 | 98.00840 | 97.983 | 1,000 | 124,254 | 980.1 |
| Max | 1,518 | 12,144 | 96 | 64 | 12,304 | 100 | 8,127 | 98.69429 | 98.671 | 1,000 | 81,274 | 987.0 |
| Max | 1,522 | 12,176 | 96 | 64 | 12,336 | 100 | 8,106 | 98.69866 | 98.674 | 1,000 | 81,063 | 987.0 |
| Max | 1,526 | 12,208 | 96 | 64 | 12,368 | 100 | 8,085 | 98.70168 | 98.677 | 1,000 | 80,853 | 987.1 |
| Max | 9,600 | 76,800 | 96 | 64 | 76,960 | 100 | 1,299 | 99.76320 | 99.763 | 1,000 | 12,993 | 997.9 |

FIG. 11    1100

| L2 Frame Size (bytes) | L2 Frame Size (Bits) | IPG (bits) | Preamble (bits) | Total bits per Frame including IPG & Preamble | FE calculations ||||| Resulting Error from true Max throughput |
|---|---|---|---|---|---|---|---|---|---|---|
| | | | | | FE Nominal phy throughput (megs) | FE Frames per Second | True FE L2 Max throughput per frame size (Megs) | True BW / FPS delta slope | Calculated Max throughput per frames less than max FPS using a slope of .00016 | |
| 32 | 256 | 95 | 64 | 415 | 100 | 240,963 | 61.687 | | | |
| 64 | 512 | 96 | 64 | 672 | 100 | 148,809 | 76.190 | 0.000160 | 76.184 | 0.008% |
| 96 | 768 | 96 | 64 | 928 | 100 | 107,758 | 82.758 | 0.000160 | 82.752 | 0.008% |
| 128 | 1024 | 96 | 64 | 1,184 | 100 | 84,459 | 86.486 | 0.000160 | 86.480 | 0.007% |
| 160 | 1280 | 96 | 64 | 1,440 | 100 | 69,444 | 88.888 | 0.000160 | 88.882 | 0.007% |
| 192 | 1536 | 96 | 64 | 1,696 | 100 | 58,962 | 90.566 | 0.000160 | 90.559 | 0.007% |
| 224 | 1792 | 96 | 64 | 1,952 | 100 | 51,229 | 91.802 | 0.000160 | 91.797 | 0.006% |
| 256 | 2048 | 96 | 64 | 2,208 | 100 | 45,289 | 92.752 | 0.000160 | 92.747 | 0.005% |
| 288 | 2304 | 96 | 64 | 2,464 | 100 | 40,584 | 93.506 | 0.000160 | 93.500 | 0.006% |
| 320 | 2560 | 96 | 64 | 2,720 | 100 | 36,764 | 94.116 | 0.000160 | 94.111 | 0.005% |
| 352 | 2816 | 96 | 64 | 2,976 | 100 | 33,602 | 94.623 | 0.000159 | 94.617 | 0.007% |
| 384 | 3072 | 96 | 64 | 3,232 | 100 | 30,940 | 95.048 | 0.000160 | 95.043 | 0.005% |
| 416 | 3328 | 96 | 64 | 3,488 | 100 | 28,669 | 95.410 | 0.000161 | 95.406 | 0.004% |
| 448 | 3584 | 96 | 64 | 3,744 | 100 | 26,709 | 95.725 | 0.000161 | 95.720 | 0.006% |
| 480 | 3840 | 96 | 64 | 4,000 | 100 | 25,000 | 96.000 | 0.000159 | 95.993 | 0.007% |
| 512 | 4096 | 96 | 64 | 4,256 | 100 | 23,496 | 96.240 | 0.000160 | 96.234 | 0.006% |
| 544 | 4352 | 96 | 64 | 4,512 | 100 | 22,163 | 96.453 | 0.000160 | 96.447 | 0.007% |
| 576 | 4608 | 96 | 64 | 4,768 | 100 | 20,973 | 96.644 | 0.000159 | 96.638 | 0.006% |
| 608 | 4864 | 96 | 64 | 5,024 | 100 | 19,904 | 96.813 | 0.000160 | 96.809 | 0.005% |
| 640 | 5120 | 96 | 64 | 5,280 | 100 | 18,939 | 96.968 | 0.000159 | 96.963 | 0.005% |
| 672 | 5376 | 96 | 64 | 5,536 | 100 | 18,063 | 97.107 | 0.000163 | 97.103 | 0.004% |
| 704 | 5632 | 96 | 64 | 5,792 | 100 | 17,265 | 97.236 | 0.000158 | 97.231 | 0.006% |
| 736 | 5888 | 96 | 64 | 6,048 | 100 | 16,534 | 97.352 | 0.000155 | 97.348 | 0.005% |
| 768 | 6144 | 96 | 64 | 6,304 | 100 | 15,862 | 97.456 | 0.000160 | 97.455 | 0.001% |

SYSTEM AND METHOD FOR TRACKING MAXIMUM THROUGHPUT AND SLA COMPLIANCE

PRIORITY

This application claims priority to provisional application Ser. No. 61/138,471 filed on Dec. 17, 2008 and is a continuation-in-part of utility application Ser. Nos. 12/381,673 now U.S. Pat. No. 7,983,189, 12/412,141, now U.S. Pat. No. 7,978,628, 12/412,127, 12/421,525 now U.S. Pat. No. 8,068,425 filed on Mar. 12, 2009, Mar. 26, 2009, Mar. 26, 2009, Apr. 9, 2009, respectively, each of which are incorporated herein by reference.

BACKGROUND

The use of and development of communications has grown nearly exponentially in recent years. The growth is fueled by larger networks with more reliable protocols and better communications hardware available to service providers and consumers. In particular, an Ethernet local area network (E-LAN) service type may be used to create a broad range of services. E-LAN service types may be utilized based on one or more service level agreements (SLA) for a multipoint service.

The SLAs may specify guaranteed or acceptable thresholds for bandwidth, throughput, frame loss ratio, and other performance metrics, characteristics, or factors. In many cases, the applicable communications network may include any number of service providers, access providers, legs, customers, and other elements that may complicate tracking performance or compliance for users or customers. The performance metrics are useful for trouble shooting, fault isolation, performance management (PM) threshold crossing, error identification, and other measurements that may not be shared between the many separate parties.

SUMMARY

One embodiment provides a system and method controlling maximum throughput for communications. A frame size of each packet communicated to a UNI may be determined. A maximum throughput may be determined in response to the determined frame size of each of the packets communicated to the UNI. Frames per second may be measured at the UNI. An amount of loss at the UNI may be determined. A message indicating the maximum throughput, the amount of loss, and the frames per second may be communicated in response to determining there is loss.

Another embodiment provides a system for controlling communications based on a maximum throughput. The system may include a UNI operable to communicate with a number of UNIs. The system may also include a network operable to communicate packets between the UNI and the number of UNIs. The UNI may include performance logic operable to determine an average frame size of packets communicated to a UNI, determine the maximum throughput in response to the determined average frame size of packets communicated to the UNI, measure frames per second at the user network interface (UNI), determine an amount of loss at the UNI, and communicate a message to one or more users indicating the maximum throughput and compliance with an SLA in response to detecting loss.

Yet another embodiment provides a UNI operable to regulate communications utilizing a maximum throughput. The UNI may include a processor for executing a set of instructions and a memory operable to store a set of instructions. The set of instructions may be executed to determine an average frame size of packets communicated to a user network interface (UNI), determine the maximum throughput in response to the determined average frame size of packets communicated to the UNI, measure frames per second at the user network interface (UNI), determine an amount of loss at the UNI, and communicate a message to one or more users indicating the maximum throughput and frame size information, the amount of loss, and the frames per second in response to determining there is loss.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system and method for determining whether a communications service provider is conforming to the terms of a service level agreement (SLA). Certain illustrative embodiments may be embodied in hardware, software, firmware, or a combination thereof. In one embodiment, bandwidth measurements and other performance metrics may be monitored by logic engines, devices, or other elements to suppress alarms during specific conditions when the alarms are not intended to be activated. Certain illustrative embodiments may be utilized to determine whether a multipoint SLA is being met without performing stress testing that may adversely affect the system or service. Certain illustrative embodiments may also determine whether frame loss or frame loss ratio (FLR) is acceptable or unacceptable according to the terms of a SLA.

Information regarding performance, state, and SLA compliance may be utilized by one or more embodiments of the present invention to determine that rate limiters or bit shapers have not sufficiently limited data traffic in a system to account for potential situations or inherent limitations. As a result, line rates have exceeded the sustainable throughput levels of the applicable ports or devices. Certain illustrative embodiments may utilize a static bandwidth profile or a dynamic bandwidth profile that accounts for different frame sizes to determine the thresholds and parameters that may be utilized to determine whether the SLA is compliant.

Two "normal" congestion states may occur in a multipoint service. The first congestion state is congestion experienced through the UNI (User Network Interface) egress point (hereafter "egress congestion" or "UNI congestion") and the second is the congestion experienced with the core network service allocated bandwidth. UNI egress congestion may occur within multipoint services because the ingress of each port is "over-subscribed" based on the fact that multiple endpoints (other UNI's) may coincidentally transmit traffic to a single destination UNI at one given time. In other words, multiple UNIs may communicate with a single UNI simultaneously. This creates an increased likelihood of congestion for multipoint services. As a result of such congestion at such a UNI egress point, point-to-point performance data may incorrectly show congestion between two points despite the fact that there is no congestion on the remainder of network services. To correctly characterize the multipoint service for purposes of reporting service level performance to customers, the performance information regarding congestion at any UNI egress point during the congestion period should be removed for more accurate SLA tracking.

The second congestion state is congestion experienced through a segment of a network used by more than one customer, such as a segment of a core network (hereafter "core congestion"). This may occur with special services and is useful when the SLA contains a "backbone" or global bandwidth limitation. In this case, the ability to transmit from all UNI ports at one time is restricted to a global amount of bits per second. This limitation may introduce a known and expected congestion state for the service. To effectively track the multipoint service using point-to-point frame loss or other performance criteria, the "congestion state" of the backbone network may need to be independently tracked. Similarly, the performance metrics for the backbone network may need to be removed from the SLA metrics to effectively characterize the network service being offered according to a particular SLA.

In one embodiment, a method may be embodied in a set of instructions stored within a memory and executed to determine compliance or non-compliance with a particular SLA. Certain illustrative embodiments may be utilized for unicast or multicast traffic. Certain illustrative embodiments may be utilized to track the state of performance and devices within communications networks and systems. In one embodiment, certain illustrative embodiments may be used to resolve SLA issues between service providers, operators, customers, and other users. In particular, certain illustrative embodiments may be utilized to display, track, and store information, data, and empirical evidence of SLA compliance and noncompliance across any number of parties, devices, or elements.

Figure 1:
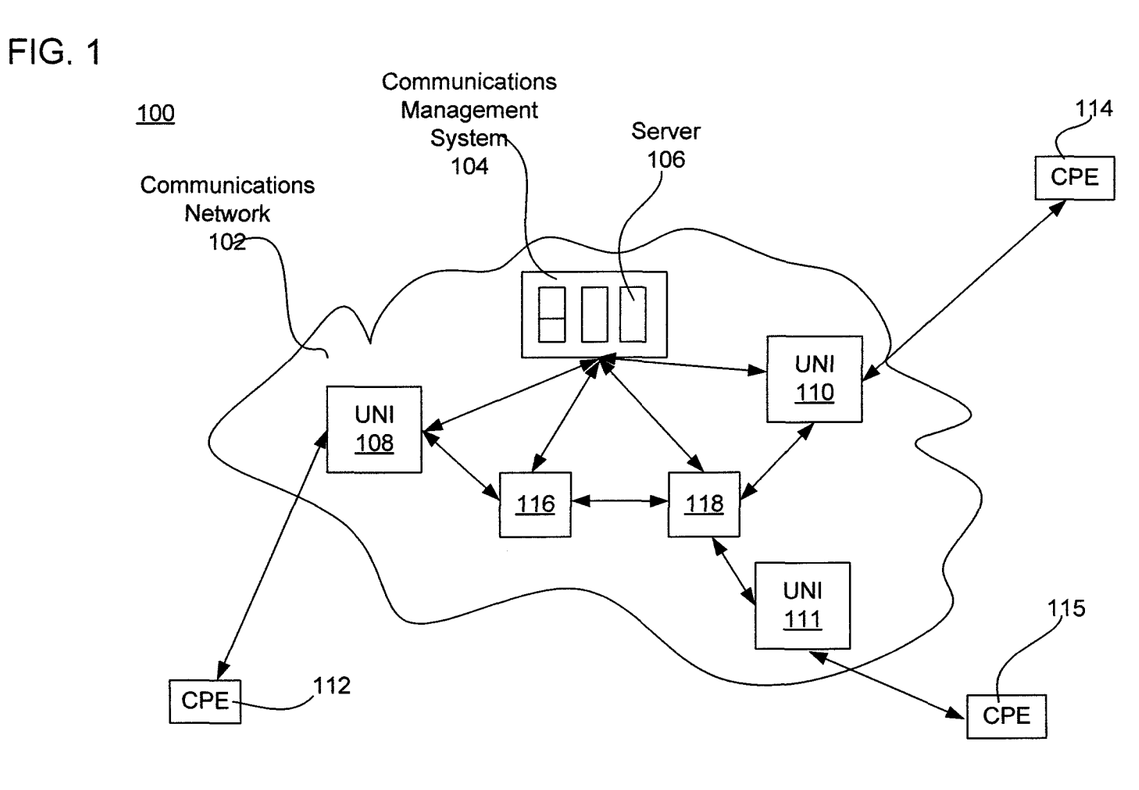
FIG. 1 is a pictorial representation of a communications system implemented in accordance with an illustrative embodiment.

FIG. 1 is a pictorial representation of a communications system implemented in accordance with an illustrative embodiment. The communication system 100 of FIG. 1 includes various elements that may be used for wireless and wired communication. The communications system 100 may include a communications network 102, a communications management system 104, a server 106, UNIs 108, 110, and 111, customer premise equipment (CPEs) 112, 114, and 115, and intermediary devices 116 and 118. The communications system 100 may include any number of these elements, devices, components, systems, and equipment in addition to other computing and communications devices not specifically described herein for purposes of simplicity. For example, the communications system 100 may include various rate limiters or bit shapers. The different elements and components of the communications system 100 may communicate using wireless communications, such as satellite connections, WiFi, WiMAX, CDMA wireless networks, and/or hardwired connections, such as fiber optics, T1, cable, DSL, high speed trunks, and telephone lines.

Communications within the communications system 100 may occur on any number of networks which may include wireless networks, data or packet networks, cable networks, satellite networks, private networks, publicly switched telephone networks (PSTN), communications network 102, or other types of communication networks. The communications network 102 is an infrastructures for sending and receiving messages and signals according to one or more designated formats, standards, and protocols. The networks of the communications system 100 may represent a single communication service provider or multiple communications services providers. The features, services, and processes of the illustrative embodiments may be implemented by one or more elements of the communications system 100 independently or as a networked implementation.

In one embodiment, the communications network 102 is a Metro Ethernet network (MEN). Metro Ethernet network is a computer network based on the Ethernet standard and covering a metropolitan area. A Metro Ethernet network may be used as a metropolitan access network to connect subscribers and businesses to a wider area network, such as the Internet. Certain illustrative embodiments may be implemented utilizing any number of packet based networks or services, such as E-LAN or VLAN.

In one embodiment, an E-LAN service type may provide a best effort service with no performance assurances between the UNIs 108, 110 and 111. The UNIs are the physical and electrical demarcation point between the user and the public network service provider. In one embodiment, the UNIs 108, 110 and 111 connect a MEN from the CPEs 112, 114 and 115.

In another embodiment, the communications service or E-LAN service type may include performance assurances, characteristics, thresholds, parameters, and information between UNIs 108, 110 and 111, such as a committed information rate (CIR). CIR is a specified amount of guaranteed bandwidth. Other performance information may include a committed burst size (CBS), an excess information rate (EIR) with an associated excess burst size (EBS), delay, delay variation, loss, and availability for a given class of service (CoS) instance. For example, EIR may be a throughput performance management that tracks all transmitted and received frame octets.

In another example, CIR may be a service performance management of conforming traffic that represents the frame loss threshold used to determine if the service is conforming to the SLA. In one embodiment, the performance guarantees are included in an SLA. The SLA specifies the communications guarantees, thresholds, and actions that are agreed to by the communications service provider and a user/customer. Each of the UNIs 108, 110 and 111 may have a specified bandwidth CIR.

Configurations, such as multipoint communications, may introduce natural conditions, such as oversubscription. Bandwidth congestion states may result under and SLA when multiple UNIs communicate with a single UNI simultaneously. Frame loss may be fully acceptable when a UNI is at the specified CIR, indicating the user or customer is breaking the boundary or threshold of allowable service.

In one embodiment, the CPEs 112, 114 and 115 may be routers. In another embodiment, the UNIs 108, 110 and 111 may be switches or other intelligent network devices. The UNIs 108, 110 and 111, the CPEs 112, 114, and 115, the server 106 and other computing and communications devices within the communications network system 100, which may include busses, motherboards, circuits, ports, interfaces, cards, connections, leads, transceivers, displays, antennas, and other similar components. The UNIs 108, 110 and 111, the CPEs 112, 114 and 115, and the server 106 may further include a processor and memory as well as other communications and computing elements including, but not limited to busses, circuits, cards, boards, ports, caches, buffers, power supplies, drives, and other components. In one embodiment, certain illustrative embodiments may be implemented by instructions stored within the memory. In another embodiment, the logic may be integrated, programmed, or stored within a circuit, chip, or card.

The processor is circuitry or logic enabled to control execution of a set of instructions. The processor may be a microprocessor, digital signal processor, central processing unit, application specific integrated circuit, or other device suitable for controlling an electronic device including one or more hardware and software elements, executing software, instructions, programs and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums. In one embodiment, the memory may store the performance management information, data, and states that are determined and tracked as herein described. The memory may include any number of databases for tracking transmitted and received packets from one or more UNIs, nodes, maintenance entities, or other devices, elements, or modules.

As described, the UNIs 108, 110 and 111 may determine whether the terms of an SLA are being met utilizing congestion states, dynamic bandwidths, and throughput comparisons. The UNI congestion and core congestion may be utilized to analyze SLA compliance or noncompliance as well as generation of relevant alarms.

Figure 2:
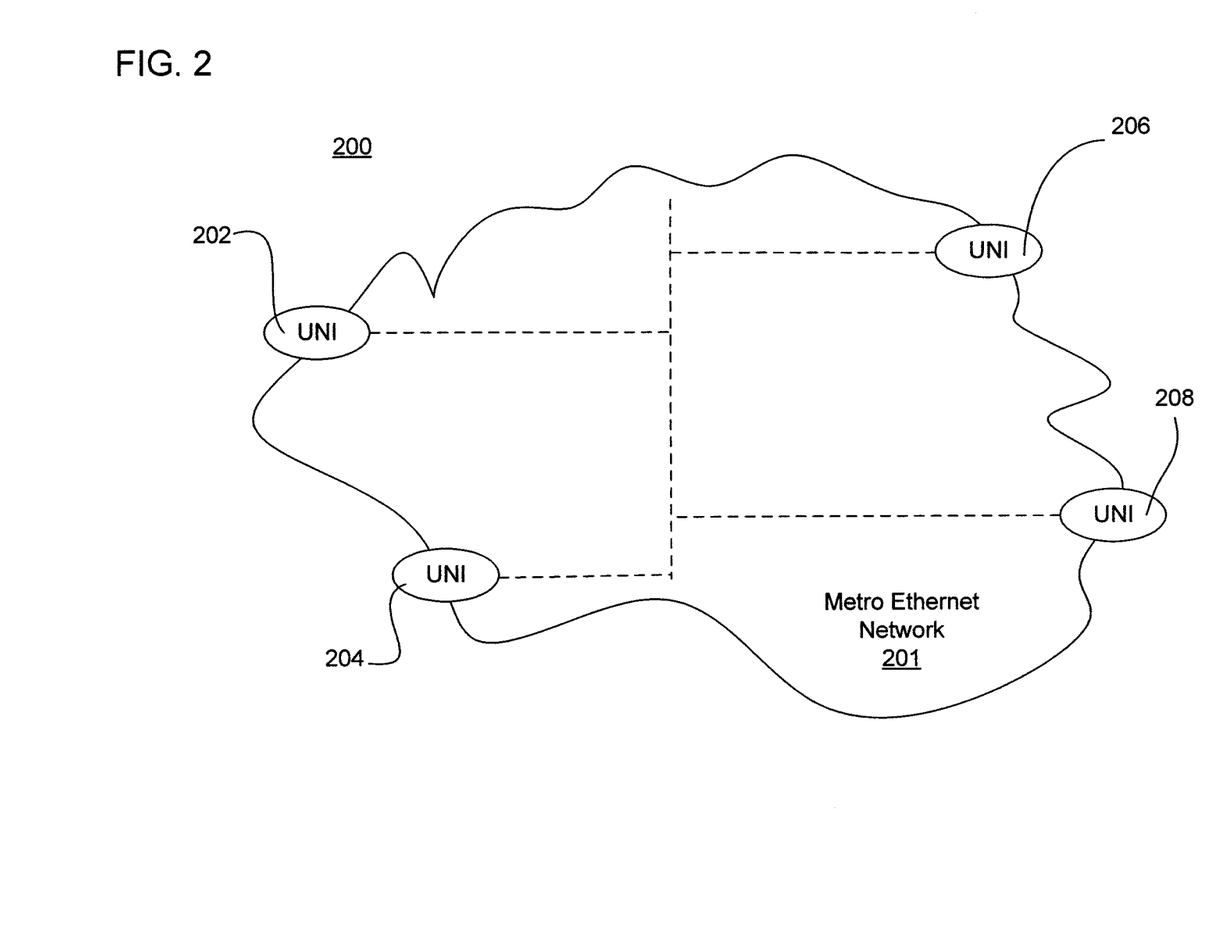
FIG. 2 is a pictorial representation of an E-LAN service type utilizing multipoint-to-multipoint Ethernet virtual connections (EVCs) in accordance with an illustrative embodiment.

FIG. 2 is a pictorial representation of a communication system utilizing multipoint-to-multipoint Ethernet virtual connections (EVCs) in accordance with an illustrative embodiment. The communication system 100 is one embodiment of an E-LAN service type. The communication system 200 may include a MEN 201, and UNIs 202, 204, 206, and 208.

In various embodiments, such as the multipoint configuration of FIG. 1, measuring the CIR performance may be difficult. The difficulty may result from communications or interconnectivity between the UNIs 202, 204, 206, and 208. UNIs 202, 204, 206, and 208 function as or are matched with one or more customer side UNI (UNI-C) and network side UNIs (UNI-N). The communication system may further include one or more network to network interfaces (NNIs), which may include external NNIs (E-NNI) and internal NNIs (I-NNI). Performance measurements and determinations of the illustrative embodiments may be performed by frame, bits, or packet counters or other devices at the port level of one or more communications devices within the communication system 100, which may also include the UNIs 202, 204, 206, and 208.

The communication system 100 illustrates one example of a shared bandwidth service in which the UNIs 202, 204, 206, and 208 may contend for bandwidth to communicate with each other. The communications service provider operating the MEN 201 may define a known bandwidth profile for each of the UNIs 202, 204, 206, and 208 which may include a bandwidth commitment. The bandwidth commitment may not be statically assigned to any specific UNI pair. As a result, using a single or even multiple UNI-to-UNI CIR bandwidth performance measurements may not be adequate to measure the parameters of the SLA agreed to by the communications service provider and the user.

In some cases, the communications service provider may guarantee bandwidth between legs of the service. The legs are connections between one or more UNIs. A guarantee between any two legs of the services reflects a core CIR. The SLA may provide guarantees for the core network, individual legs, and other point to point communications. In order to conform with the SLA, any of the UNIs 202, 204, 206, and 208 may be required to transmit (i.e. tx) and/or receive (i.e. rx) a throughput CIR. In some cases traffic contentions (i.e. multiple UNIs communicating with a single UNI simultaneously) may result in frame loss because of the contention for the shared bandwidth. If a frame loss ratio is utilized as a SLA indicator, the amount of bandwidth frames that may be communicated without contention is significantly smaller than the full bandwidth profile. Certain illustrative embodiments provide a system and method for addressing contention problems to individual UNIs, across legs, or through the network.

In one example, a communications service provider may sell service to four customers as represented by the UNIs 202, 204, 206, and 208. The SLA with each of the customers may guarantee an amount of bandwidth to each customer UNI, such as 1 Gb/second. However, problems result when the customers are communicating with one another at the same time. A SLA measurement for monitoring is performed in order to determine compliance. Communication between customers occurs frequently and could be web traffic, streaming data, phone calls, or other forms of communications.

In one example, the SLA guarantee for the four node configuration shown in FIG. 2 may be determined by taking the CIR throughput level to the customer represented by UNI 202, 1 Gig, and dividing by three (the customer cannot be in communication with itself) to determine the guaranteed CIR is approximately 333 Mb.

Based on new interconnection standards and network configurations using frame loss as a metric to determine an SLA guaranteed CIR is problematic because of potential communications between the UNIs 202, 204, 206, and 208. Similarly, testing SLA guarantees via the application of throughput stress testing to confirm a CIR may cause problems by breaking operational rules, disrupting live service traffic to any number of other customers, and potentially crashing applications or portions of the MEN 201. Typically, stress testing degrades the shared bandwidth of the service itself and may not capture transient defective states that may occur. An illustrative embodiment may be utilized to track throughput performance measurements that may alleviate the need for in-service traffic testing utilizing synthetic or test packets that do not represent normal network traffic.

In another embodiment, the system and methods described herein may be utilized to measure real-time, non-real-time, and test packets and traffic. Test packets may be sent to represent real-time and non-real-time packet communications. In one embodiment, a test packet may be generated for every 1000 real-time packets, representative of applications, such as VoIP or gaming. By sending the test packet for every 1000 real-time packets any number of measurements or determinations may be made or inferred about individual or collective devices, connections, or networks. In another embodiment, a test packet may be generated for every 2000 non-real time packets, representative of applications, such as browsing. In yet another embodiment, the test packet(s) or pattern may be run for every 1000 packets (real-time and non-real-time) sent through a UNI. Test packets may also be sent based on timing or other similar factors or conditions.

In one embodiment, the size of the test packet, frame, or pattern may be randomly selected. In another embodiment, the size of the test packet may correspond to the average size of packets sent through the network or device. For example, the average size of packets as measured by a counter or intelligent network device may be determined for generating the packet at the average size. The test packets may be utilized to determine or compile information regarding actual throughput, delay, actual line rate, frames per second, or other factors.

In one embodiment, in order to set a CIR frame loss rate level so that it may not indicate loss, the level may be set to a threshold in which no contention occurs on the UNI. For example, CIR=UNI bandwidth/(# nodes −1). In another embodiment, the CIR may be set so that it is no more than fifty percent of the service offered to the UNIs 202, 204, 206, and 208.

The bandwidth utilization or CIR utilization may be measured numerically or statistically for each potential communications path in the MEN for communication data. For example, throughput counters and frame loss indicators may monitor and record relevant information and performance metrics. The traffic may be measured utilizing any number of devices or applications that track, measure, and/or record network traffic measurements. Frame loss is only expected when the SLA limits are exceeded or UNI congestion occurs. For example, the UNI 206 may have a CIR of 100 Mb. No frame loss is expected if less than 100 Mb are received, if however, UNI 202 transmits 80 MB to UNI 206, UNI 204 broadcasts 40 Mb, and UNI 208 broadcasts 30 MB, the incoming bandwidth is 150 Mb exceeding the CIR of 100 Mb. As a result, frame loss is expected and the SLA is considered to be compliant despite the frame loss.

Second, the core of the MEN 201 itself may have a core CIR. Tracking frame loss rate between all UNIs 202, 204, 206, and 208 does indicate if congestion or faults are occurring at a UNI if the core has reached an SLA capacity. During the time frames when the service is running at full capacity frame loss rate becomes expected or is within SLA compliance or acceptable behavior. For example, the MEN 201 may have a core CIR of 800 Mb. If UNIs 202, 204, and 206 communicate 250 Mb and UNI 208 communicates at 200 Mb, the core CIR of 800 Mb is exceeded by 150 Mb and frame loss is determined to be acceptable. As a result, potential alarms are not generated and the communications service provider is determined to have not violated the SLA despite the frame loss. Tracking UNI congestion and core congestion through frame loss indicators and UNI states enable true SLA conformance measurements.

The examples given of 95% of CIR and 1% are illustrative thresholds, UNI 1 tracks TX, RX for itself (i.e., alarms on the RX of UNI 1). The measurements and calculation of throughput and frame loss may be accomplished using any suitable packet counter, network probe, analysis tool, which may be integrated with a UNI, router or other network node or be displayed in line with such a device.

Figure 3:
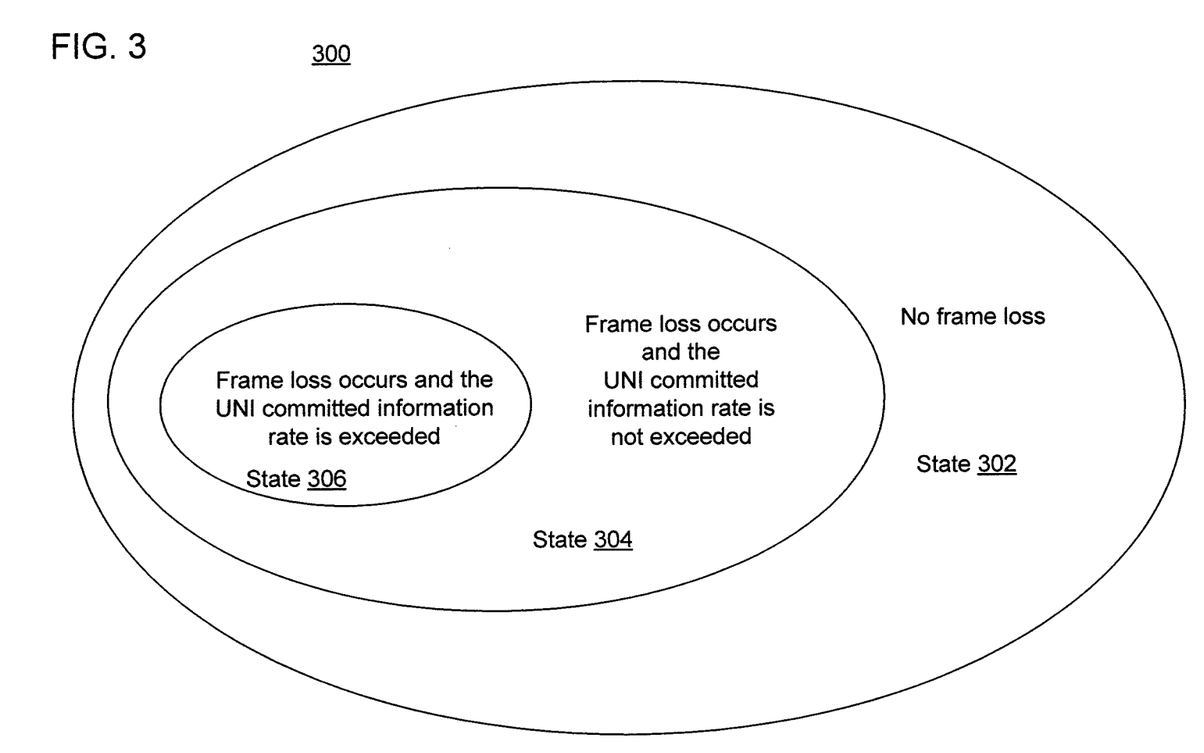
FIG. 3 is a state diagram of SLA states in accordance with an illustrative embodiment.

FIG. 3 is a state diagram of SLA states in accordance with an illustrative embodiment. The state diagram 300 of FIG. 3 may be embodied or implemented in a chip or chipset, digital logic, fully programmable gate arrays, or an application for determining the status of an SLA. In one embodiment, FIG. 3 may be applicable to Scenario 1 described above. The state diagram 300 may include states 302, 304, and 306. Service providers, operators, customers, and other groups may need the ability to isolate states of the network. The states may be utilized to minimize service interruptions, repair times, and operational resources by detecting, diagnosing, localizing, and notifying network management systems of defects in order to take corrective actions appropriate to the type of defect.

Figure 4:
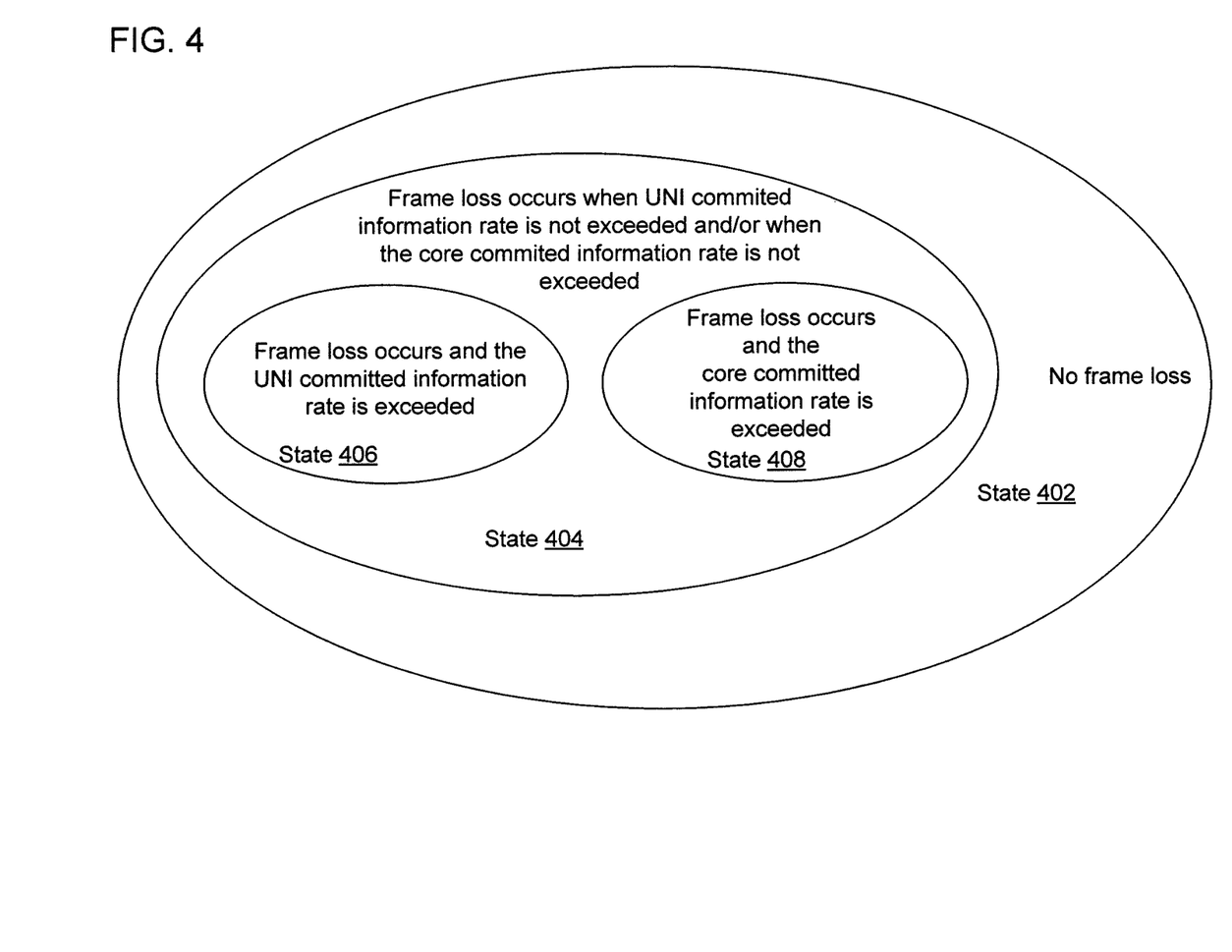
FIG. 4 is a state diagram of SLA states in accordance with an illustrative embodiment.

The state diagrams of FIGS. 3 and 4 may be utilized at one or more nodes in a network to determine whether the SLA is being met and record live traffic throughput to capture applicable thresholds as frame loss begins to occur. In one embodiment, the receiving portion of the UNI or node may perform all determinations of SLA compliance. In another embodiment, the applicable states may be performed by a measurement information base (MIB). States 302, 304, and 306 may indicate an alarm state, suppress alarms or take one or more associated actions. The states may be utilized to dynamically determine usage and oversubscription information and profiles for traffic engineering and network management and design. The states may also be utilized to record and store network or UNI characteristics and performance information at the moment(s) the alarm state is triggered.

In state 302 and state 306, the SLA is in compliance. In state 304, the SLA is in non-compliance. In state 302, no frame loss occurs. The SLA may be considered to be compliant.

In state 304, frame loss occurs in excess of the frame loss permitted under the SLA and the UNI CIR is not exceeded. As a result, the SLA is considered to be non-compliant. The SLA is non-compliant because the CIR is not being exceeded by the customer, but yet there is still frame loss in excess of the frame loss permitted under the SLA that does not fall within the terms of the SLA. As a result, any number of alarms may be activated or asserted indicating frame loss for troubleshooting, diagnose, and other corrective actions.

In state 306, frame loss occurs in excess of the frame loss permitted under the SLA and at the same time, the UNI CIR is exceeded. State 306 is acceptable because the user has exceeded the bandwidth guaranteed to the user at the transmit or receive end of the customer port and as a result frame loss and non-compliance with the SLA is acceptable. During state 306, any number of alarms that may be activated due to frame loss may be ended or turned off because the UNI CIR is exceeded. The determinations of the alarm state utilizing states 302, 304, and 306 may be performed locally by a device or performance information may be communicated to a separate network device for determination and alarm state management and control.

FIG. 4 is a state diagram of SLA states in accordance with an illustrative embodiment. The state diagram of FIG. 4 may be implemented or function with other state diagrams, such as FIG. 3. The state diagram 400 may include states 402, 404, 406, and 408. In one embodiment, FIG. 4 may be applicable to Scenario 2 described above. In some cases, service providers do not provide broad guarantees for bandwidth. For example, the communications service provider may limit the SLA based on a leg CIR and a core CIR through the network. As previously described, in the state 402 no frame loss occurs in excess of the frame loss permitted under the SLA and the SLA is considered in compliance.

In state 404, frame loss occurs when the UNI CIR is not exceeded and/or when the core CIR is not exceeded. As a result, the SLA is considered noncompliant in state 404. Any number of alarms or indicators may be set or initiated in response to entering state 404.

In state 408, frame loss occurs in excess of the frame loss permitted under the SLA when the core CIR is exceeded, the SLA is determined to still be in compliance. In state 406, if frame loss occurs when the UNI CIR is exceeded, the SLA is determined to still be in compliance. During states 406 and 408, alarms, such as those activated for state 404, may be deactivated, cancelled, or disengaged because of the noncompliance with the SLA.

In one embodiment, the communications service provider may track the packets transmitted and received over the core network (all UNIs bundled together) between each UNI pair, and to each and from each UNI. Although not illustrated herein, the embodiments described in FIGS. 3 and 4 may be expanded to further consider whether or not the CIR of a remote node or UNI has been exceeded. If the CIR for such remote UNI have been exceeded, network performance measurements indicating a performance issue such as excessive frame loss that include the measurement of traffic to or from the remote UNI may also be permitted despite violating a particular service level because of the exceeded CIR.

For SLA compliance, a throughput SLA does not provide accurate information on SLA compliance. As a result, frame loss is still required as an important metric to determine compliance with the SLA requirements. Determining SLA compliance may be performed as described by the various illustrative embodiments.

Certain illustrative embodiments may allow a communications service provider or customer to measure metrics used to determine whether obligations are being met under an SLA. The proposed systems and methods do not require stress testing the network in order to determine SLA compliance. Additionally, certain illustrative embodiments may be utilized by network engineers to determine potential traffic and demonstrate compliance with SLAs when customers are operating within their CIRs. Additionally, communications service providers may use certain illustrative embodiments to ensure that they do not oversell bandwidth, legs, or the core user to provide their service.

Bandwidth

Throughput performance management rates are frequently discussed in terms of Ethernet frame octets received (EFOR) and Ethernet frame octets transmitted (EFOT). The throughput rate is the amount of EFOR and EFOT measured over a short time period. In one embodiment, the throughput rate may be measured with respect to the bits passing through a maintenance entity, network node, or Access Transport Resource Control Functional (A-TRCF) entity for the CIR, extended information rate (EIR), or both together as a single measure of throughput. Performance measurements, such as frame loss, may be calculated based on all network traffic or only based on conforming traffic, such as traffic that is within a customer CIR.

Ethernet has multiple standard frame sizes whereas asynchronous transfer mode (ATM) has one frame size. In one example, Ethernet frames may vary in size from 64 to 1,518 octets. This however, does not include 96,200 jumbo frames supported by Gig-E. Live Ethernet traffic includes mixed types of packet sizes with Voice over Internet Protocol (VoIP) packets generally being around 128 bytes, and Internet traffic being composed of both 64 byte and 1,518 byte packets. Given that the service blend of packets of differing size is dynamic and that differences may exceed two orders of magnitude, such frame loss as a performance indicator is inaccurate. The deviation in packet size makes using frames per second or frame rate measurements an invalid throughput indicator or performance measurement. Clock skew in Ethernet chips may also cause variations as high as 1% in the amount of frames that may be transmitted due to variations in frame gaps. Although not illustrated herein, the embodiments described in FIGS. 3 and 4 may be expanded to further consider whether or not the CIR of a remote node or UNI transmitting to the illustrated UNI has been exceeded. If the CIR for such remote UNI have been exceeded, network performance measurements indicating a performance issue such as excessive frame loss that include the measurement of traffic to or from the remote UNI may also be permitted despite violating a particular service level because of the exceeded CIR.

Figures 5, 6:
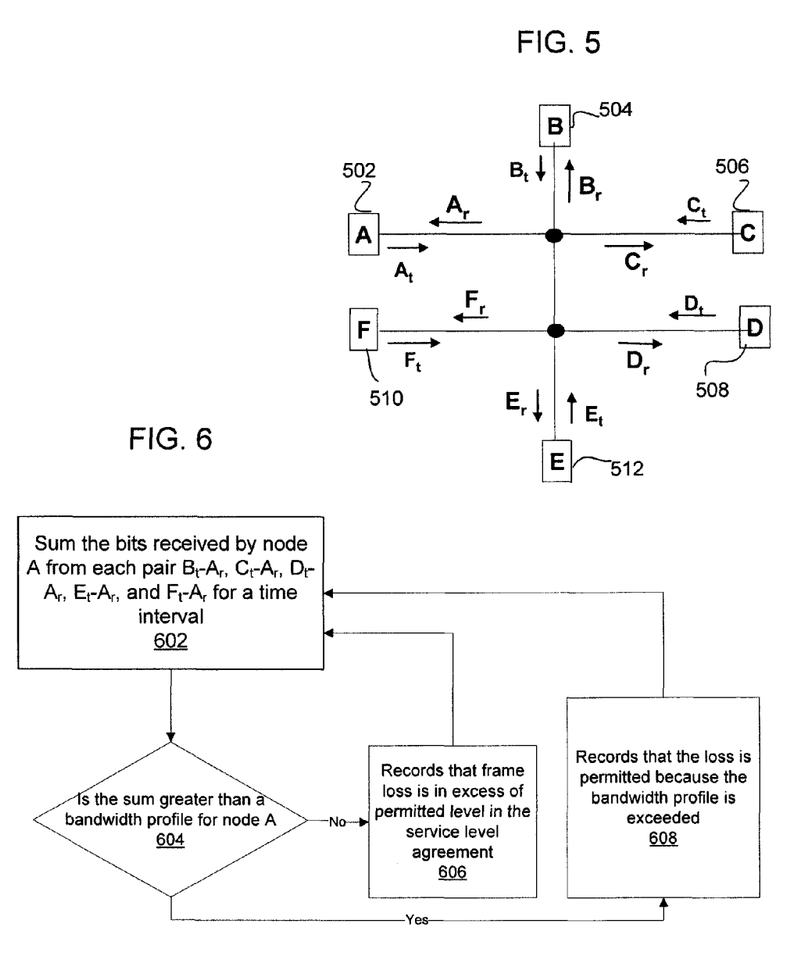
FIG. 5 is a pictorial representation of nodes in a network in accordance with an illustrative embodiment.
FIG. 6 is a pictorial representation of a flowchart of a process for determining whether losses within a network comply with a SLA in accordance with an illustrative embodiment.

FIG. 5 is a pictorial representation of nodes in a network in accordance with an illustrative embodiment. FIG. 5 shows multiple nodes that may be included in a network. In one embodiment, the network may include node A 502, node B 504, node C 506, node D 508, node E 512, and node F 510. As previously described, the nodes may represent any number of UNIs, devices, components, equipment, ports, or constructs.

The nodes may both transmit and receive data to any of the other nodes as shown. As previously described, a network performance device or process may not be able to determine compliance with a SLA when multiple nodes communicate with a single node simultaneously. For example, node B 504, node C 506, and node D 508 transmit data to node E 512 at the same time utilizing a large amount of bandwidth that exceeds the terms of the SLA. Certain illustrative embodiments provide a system and method for compensating for the situations of FIGS. 5 and 7 without generating alarms, recording SLA violations or entering an error state.

FIG. 6 is a pictorial representation of a flowchart of a process for determining whether losses within a network comply with an SLA in accordance with an illustrative embodiment. The process of FIG. 6 may be implemented by a UNI or other node in accordance with an illustrative embodiment. Although specifically described for one node in an illustrative embodiment, the process of FIG. 6 may be performed for multiple UNIs.

The process may begin with a UNI or other device summing the bits received by node A from each of nodes B through F for a specified time interval (step 602). The nodes may represent UNIs communicating with the UNI being monitored, such as node A thereby establishing UNI pair Bt-Ar, Ct-Ar, Dt-Ar, Et-Ar, and Ft-Ar. The time interval may be any measure specified by the network administrator. In one embodiment, the time interval may be an amount less than 1 second. The measurement in step 602 measures the total amount of bits received by a node from all nodes within the network for such time interval. In one embodiment, the measurement or calculation of step 602 may be initiated in response to a determination that there is loss within the network or at the UNI being monitored.

Next, the UNI determines whether the sum of the summed bits is greater than a bandwidth profile for node A (step 604). The bandwidth profile may be specified by the SLA. For example, the bandwidth profile for node A may be included in a customer agreement with a communications service provider.

If the UNI determines that the sum of the summed bits is greater than a bandwidth profile or CIR for node A, the UNI may indicate or store an indication that the frame loss triggers a violation of the SLA (step 606). In one embodiment, the frame loss may trigger an obligation of the communications service provider. For example, the communications service provider may be required to provide a customer associated with the UNI a discount, credits, or remedy for the loss.

If the UNI determines that the sum is greater than a bandwidth profile or CIT for node A, the UNI may indicate that the frame loss is permitted and does not trigger a violation of the service level agreement because the bandwidth profile has been exceeded (step 608). Such indication may occur because multiple nodes are communicating with the UNI simultaneously in a manner that is not within a CIR or that is otherwise not supported by the SLA.

Figure 7:
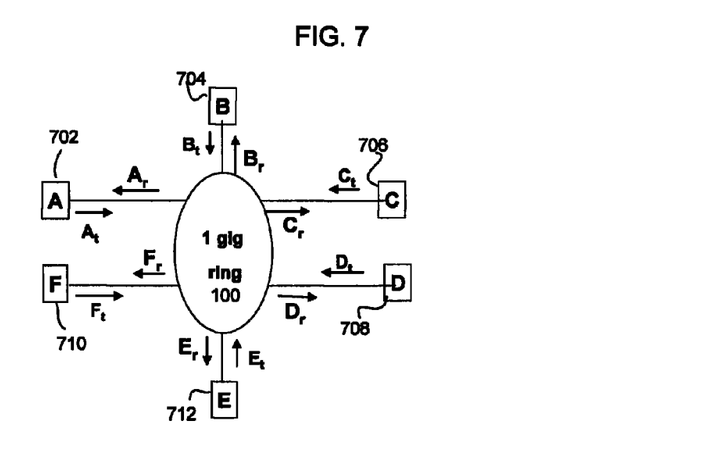
FIG. 7 is a pictorial representation of a network ring in accordance with an illustrative embodiment.

FIG. 7 is a pictorial representation of a network ring in accordance with an illustrative embodiment. FIG. 7 shows multiple nodes that may communicate through a ring 100 in a network. In one embodiment, the ring 100 may communicate with node A 702, node B 704, node C 706, node D 708, node E 712, and node F 710. As previously described, the nodes may represent any number of UNIs, devices, components, equipment, ports, or constructs. The ring 100 is the core of a network. The ring 100 is one embodiment of any number of topologies that may be utilized in a communications environment as all or a portion of a network. The ring 100 may include any number of interconnected devices, equipment, and systems. The nodes may communicate with the other nodes through the ring 100, as shown. As previously described, the ring 100 may not be able to determine compliance with a SLA for guaranteed core performance when multiple nodes communicate through the ring 100 at or near maximum capacity simultaneously. For example, if node B 704, node C 706, node D 708, and node E 712 transmit and receive data at their maximum bandwidth simultaneously, the terms of the core SLA may be exceeded. Certain illustrative embodiments provide a system and method for monitoring such situations without entering an error state.

Figure 8:
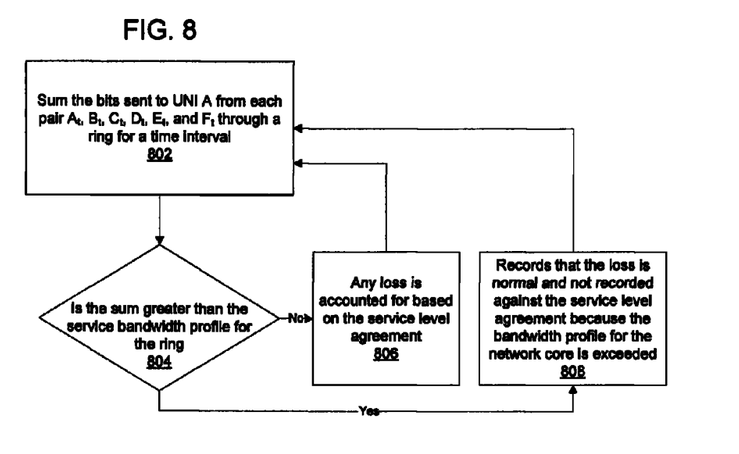
FIG. 8 is a pictorial representation of a flowchart of a process for determining whether losses within a network comply with a SLA for core throughput in accordance with an illustrative embodiment.

FIG. 8 is a pictorial representation of a flowchart of a process for determining whether losses within a network comply with an SLA for core throughput in accordance with an illustrative embodiment. The process of FIG. 8 may be implemented by a UNI, application engine within a server, or other element of a communications management system. Although specifically described for one node, in an illustrative embodiment, the process of FIG. 8 may be performed for multiple nodes or UNIs simultaneously.

The process may begin by summing the bits received by UNI A from each node $B_t$, $C_t$, $D_t$, $E_t$, and $F_t$ comprising five nod pairs through a ring over a particular time interval (step 802). The pairs may represent all UNIs communicating directly with the UNI being monitored, such as UNI A. The time interval may be any measure specified by the network administrator. In one embodiment, the time interval may be an amount less than 5 seconds. The measurement in step 802 measures the total amount of bits received by UNI A from nodes within the network for the time period. In one embodiment, the measurement or calculation of step 802 may be initiated in response to a determination that there is frame or packet loss within the network or at the UNI being monitored, network congestion, or other network issues.

Next, the UNI determines whether the sum is greater than a bandwidth profile for the ring (step 804). The bandwidth or throughput profile may be specified by the SLA. For example, UNI A may represent a UNI of a customer that has an agreement with a communications service provider for core bandwidth through a ring or core portion of the network.

If the UNI determines that the sum is not greater than a bandwidth profile for the ring, the UNI records that any loss is accounted for based on the SLA. (step 806). In one embodiment, the loss may be required to be accounted for by the communications service provider. For example, the communications service provider may be required to provide a customer associated with the UNI a discount, credits, or retribution for the loss.

If the UNI determines the sum is greater than a bandwidth profile for the ring, the UNI records that the loss is normal and not recorded against the SLA because the bandwidth profile for the network core is exceeded (step 808). The recordation of step 808 indicates that the loss is occurring because multiple UNIs are communicating through the ring simultaneously in a manner that is unsustainable and not supported by the SLA. For example, the core bandwidth of the ring may be one gigabyte and may be exceeded by four UNIs simultaneously transmitting (or attempting to transmit) at 500 Mb.

Another matter complicating the issue of determining if a frame loss occurrence is normally expected is the use of a bit based rate limiter or shaper at one end of a path and a physical UNI port at the opposite end. Rate limiters enforce bandwidth profiles based upon bit rates and not frame sizes. UNI ports, however, have a frame size dependant bandwidth profile that limits the amount of "effective" bit throughput that may be transmitted through the port at any given time. This relationship is caused due to the "cell tax" or inter-frame-gap (IFG) and inter-frame-overhead, and other frame components, such as the start frame delimiter (SFD), that are not counted by bit based rate shapers. The end result of the UNI bandwidth profile is that for every frame per second transmitted through a UNI the "cell tax" overhead of the IFG, and other non-bits are subtracted from the UNI line rate. This relationship results in small frames having less "effective" throughput or bit based throughput than large frames. However, rate shapers and rate limiters do not change their bandwidth profile with frame size as do UNI ports. This causes a mismatch in the bit based rate limiter to frames size dependant throughput profile of a port. In one embodiment, when a rate limiter uses a 76.2% or higher bandwidth profile of the UNI port line rate frame loss may occur because of the frame size dependency at the UNI port. To account for frame size, a frame per second dynamic bandwidth profile tool may be required to decipher if the bandwidth loss was caused by the bandwidth profile mismatch of a rate limiter to the UNI, which is frame size dependant.

Figure 9:
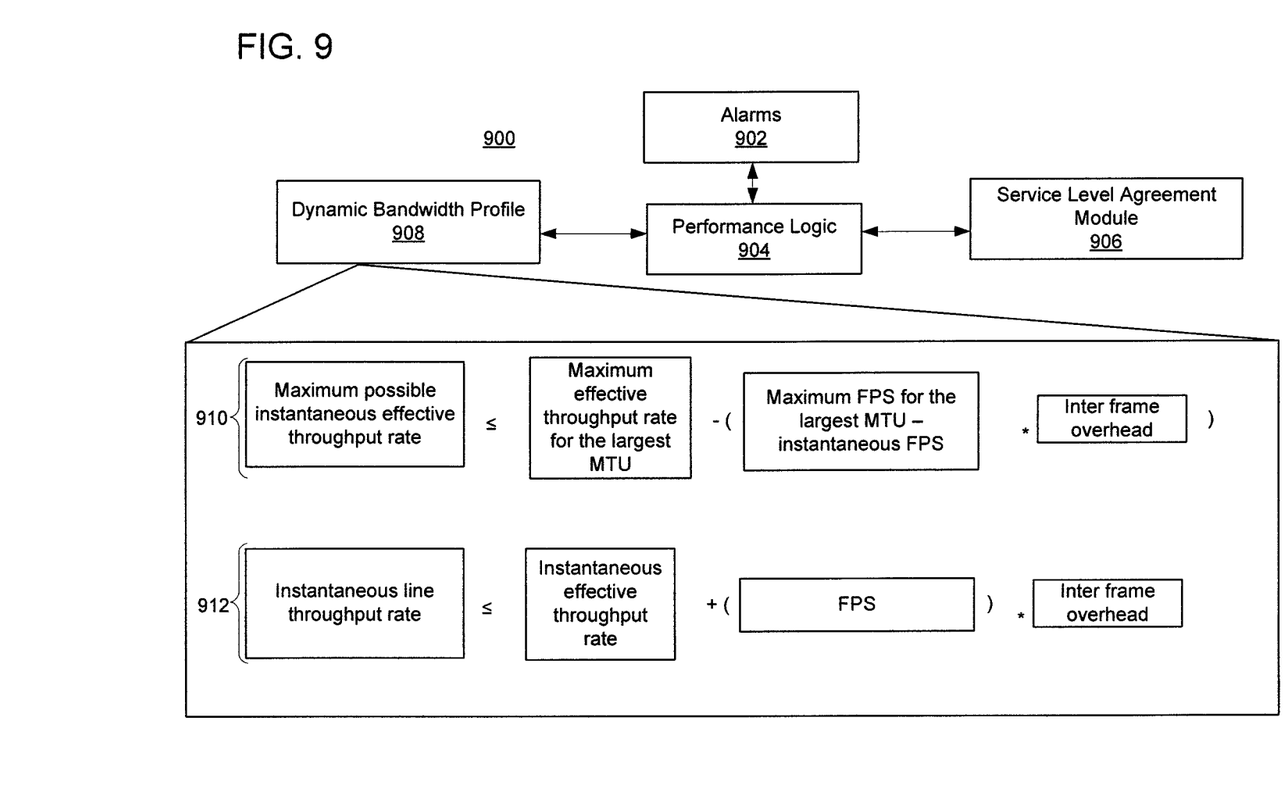
FIG. 9 is a pictorial representation of a network performance system in accordance with an illustrative embodiment.

FIG. 9 is a pictorial representation of a network performance system in accordance with an illustrative embodiment. In one embodiment, the network performance system 900 of FIG. 9 may be encompassed in a device, such as a UNI. A network performance system 900 may include or perform basic measurements, derived calculations, and threshold crossings. The elements may be circuits, logic, or hardware or may include a program, instructions, or stored elements. FIG. 9 may further include one or more interfaces communicating with a number of rate limiters, policers rate shapers, or network modules. FIG. 9 may also be utilized to perform the other methods and processes herein described. In one embodiment, the network performance system 900 may include alarms 902, performance logic 904, SLA module 906, dynamic bandwidth profile 908, and logic 910 and 912.

The alarms 902 represent service or system messages alerts that may be generated in response to the rules of SLA module 906 being violated based on the dynamic bandwidth profile 904 (and associated thresholds) as determined by the performance logic 904. The message or alarm may include a variety of information, factors and network conditions measured, calculated, or inferred including: maximum throughput (including effective and instantaneous rates), measured throughput, maximum frames per second, measured frames per second, loss, compliance with the SLA, packet size, average packet size, total available bandwidth, thresholds, physical line rate, measured line rates (instantaneous and effective). The performance logic 904 is the circuits, instructions, and other intelligent components operable to determine whether the service level agreement has been violated utilizing a static bandwidth profile or the dynamic bandwidth profile 908. The SLA module 906 may utilize rules based on any number of states, steps, or processes as previously described in FIGS. 3-8.

The dynamic bandwidth threshold 908 may act to regulate a policing function or policer by providing feedback that may be utilized to reduce throughput limits (i.e. based on frame size and frames per second). The dynamic bandwidth threshold may simply be used to gauge if a rate limiter failed to enforce a small frame bandwidth profile, which was discarded by a UNI port. The dynamic bandwidth profile 908 may be applicable to ports or devices. The dynamic bandwidth profile 908 may utilize logic 910 or logic 912. Logic 910 indicates the maximum instantaneous throughput rate based on a frame rate in terms of a threshold that may be utilized to determine compliance with an SLA. Logic 912 indicates the instantaneous line throughput rate as compared to the capabilities and capacity of the physical line rate. Either logic 910 or 912 may be utilized to determine compliance with an SLA utilizing throughput ranges and thresholds in terms of payload or line rate (logic 910 or 912, respectively). The throughput ranges specify minimum and maximum throughput levels or thresholds based on frame sizes of packets communicated. The throughput ranges may be incorporated within the SLA negotiated between a service provider or company. Alternatively, the SLA may be incorporated in a customized application with terms, thresholds and parameters, that are individually determined. For example, the minimum value of the throughput range may be much lower for small packets than for large packets because of the introduction of overhead. The maximum instantaneous throughput rate and the instantaneous line throughput rate may also be referred to as the "maximum throughput."

The logic 910 and 912 may be utilized in response to determining there is packet loss to determine compliance or non-compliance with terms of the SLA particularly relating to throughput or lines rates. Compliance with the SLA incorporates acceptable ranges based on inter-frame overhead, skew, packet or frame size, and similar factors. Logic 910 and 912 provide utilization information in terms of effective throughput rate or line rate.

In one embodiment, the dynamic bandwidth profile 908 may establish the maximum effective transmission rate based upon the UNI port's maximum frames per second at the largest and smallest maximum transmission unit (MTU) size, and the corresponding effective throughput rate for that MTU size and frame rate. In a second embodiment, the dynamic bandwidth profile may be based upon the UNI line rate, and the frames per second measure, with the corresponding frame overhead or "non-bit" counted portions of each frame. For example, the dynamic bandwidth profile 908 may be utilized directly with the network bit based throughput counters to determine if the traffic present conforms to the port's frame based throughput instead of a static bandwidth profile in response to the dynamic bandwidth profile 908 which exists due to protocol overhead for small frames between 76.2% and 100% of the port line rate speed. The relevant speeds and percentages may be determined based on industry standard inter-frame-gap and "non-bit" overhead, such as SFD.

An example may be utilized to explain logic 910. In an illustrative embodiment, a single circuit with a Gig-E may be located at one end, and a 100 Mb Fast Ethernet port may be located at the second end. The service may be a 100 Mb service with a "rate-limiter" at the Gig-E end. In effect, the rate limiter will pass 100 Mbs of effective throughput. However, with small packets, such as 64 byte frames, only 76.2 Mbs of payload may fit inside of the 100 Mb line rate port due to overhead. However, 99.8 Mbs of 1581 byte frames will fit into the port due to a lower ratio of overhead to payload. The bandwidth profile of the rate limiter is not frame size dependant, and the bandwidth profile of the Fast Ethernet port is frame size dependant.

The rate limiter is typically a bit based effective throughput bandwidth profile and may not be constrained by a line rate, and as a result, may allow too many small frames through the service. As a result, the small frames may be dropped at the far end when the frames attempt to enter the UNI or 100 Mb Fast Ethernet port.

A dynamic frames per second "threshold" may be required to identify if the line rate of the frames being transmitted exceeded the bandwidth profile of the UNI port. Given that the frame bit counters commonly used by packet systems do not typically use a line rate, logic, an equation, algorithm, or other instructions may convert the instantaneous bandwidth (during a short time period) to a line rate that may be used to determine if the effective throughput may be communicated through the port or is less than the port speed.

The logic 912 may be utilized to convert the effective bandwidth to a line rate. If the effective bandwidth rate exceeds the UNI port line rate, the frame loss is not counted because those frames exceeded the UNI port rate (line rate, e.g., 100 Mbs). Normally, the effective throughput measurement does not detect such conditions.

The logic 912 may utilize a "static UNI line rate threshold" to determine if the throughput allowed by the rate limiter was or was not service conforming (able to be communicated through the UNI port). The logic 912 may utilize the instantaneous throughput determined by the bit counters and add the overhead of the IFG to the effective throughput to adjust to a line rate standard. That value is then compared to the line rate. If the value is above the port's line rate, the traffic does not conform to the service. If the value was below the line rate (100 Mb), then the traffic did conform and the loss should not have occurred.

The following provides additional details and embodiments for the logic 910 and/or 912. In one embodiment, the dynamic bandwidth profile 908 may determine throughput rate of a port. The throughput rate may be determined to be less than or equal to a determination of parameters. In one embodiment, the parameters may include effect throughput rate, port speed, the frames per second, and the inter-frame overhead. In many cases, packet technologies are non-synchronous and use inter-packet or inter-frame gap with a "start of frame" bit pattern to signal that the information that follows is a packet. Inter-frame gap as well as frame and packet sizes may vary the throughput potential of communications devices, systems, and links dependant upon packet size.

Throughput is dependent on frame size and may change as the frame size changes dynamically. As a result, packet service level capacities are often stated in terms of the throughput rate of the MTU size or frame size. For example, 90 Mbs with 1518 byte frames. However, the use of smaller frames yields less throughput capacity. In one ongoing example, 64 bytes have a throughput capacity of 76.2 Megs for a 100 Megabyte port. In effect, every time a frame is added for a given time period, the size of the overhead and non-payload bits relative to the overall frame size also increases.

Therefore, the maximum MTU throughput rate minus the added incremental frames per second multiplied by the inter-frame overhead yields the instantaneous dynamic effective throughput capacity. Such logic may be expressed by subtracting the current frame per second interval from the fastest rate that frames may be sent per second for the maximum MTU size multiplied by the inter frame overhead and then subtracting that value from the maximum MTU size effective throughput. The result is a threshold that indicates the amount of payload or effective bits that may pass through the service based on the loss of throughput due to the added frames per second overhead.

For example, the dynamic bandwidth profile 908 may be utilized to determine that the actual effective frame per second dependant bandwidth profile 910 is 76.2% of service payload utilizing 64 byte packets and 99.8% of service payload with 1518 byte packets. As a result, the systems, devices, user, or equipment may account for the potential 24% of overhead by adjusting line rates and throughput levels. The dynamic bandwidth profile 908 may ensure that frame loss does not occur between a UNI-N and a UNI-C.

Figure 10:
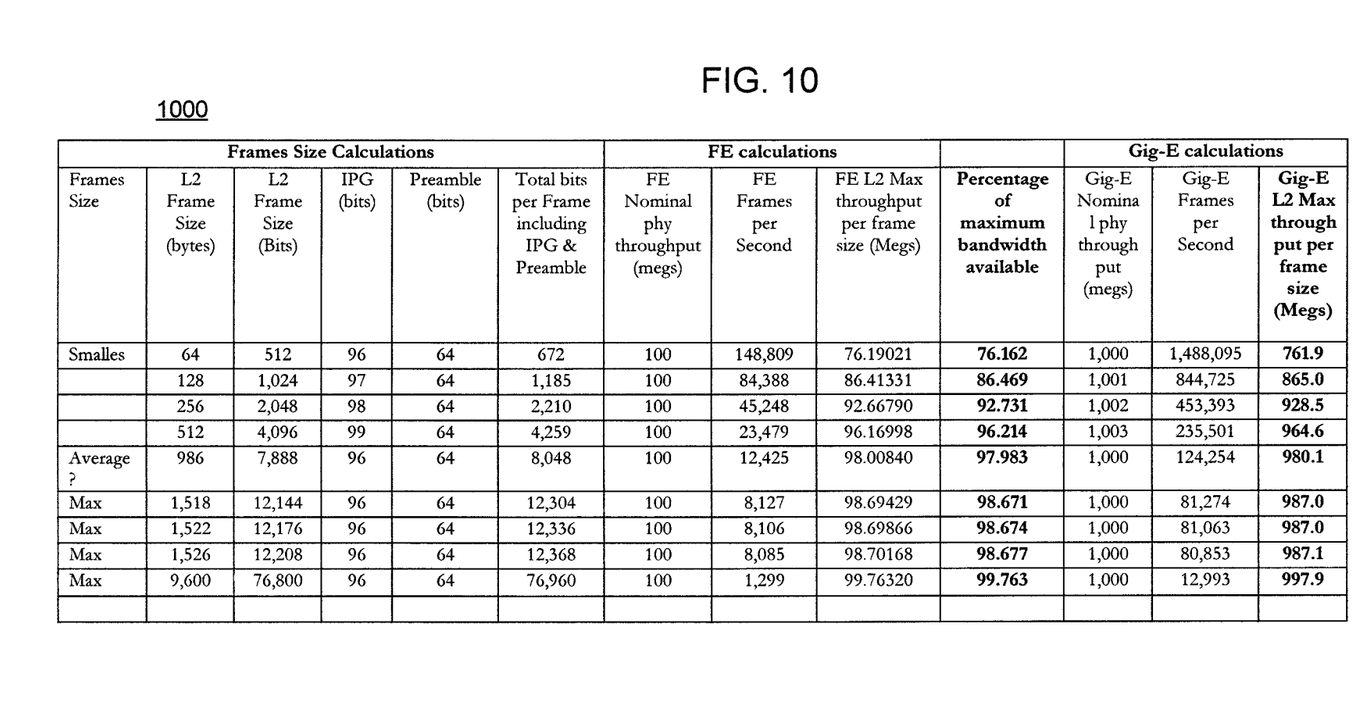
FIGS. 10 and 11 are pictorial representation of bandwidth tables in accordance with illustrative embodiments.
Figure 11:
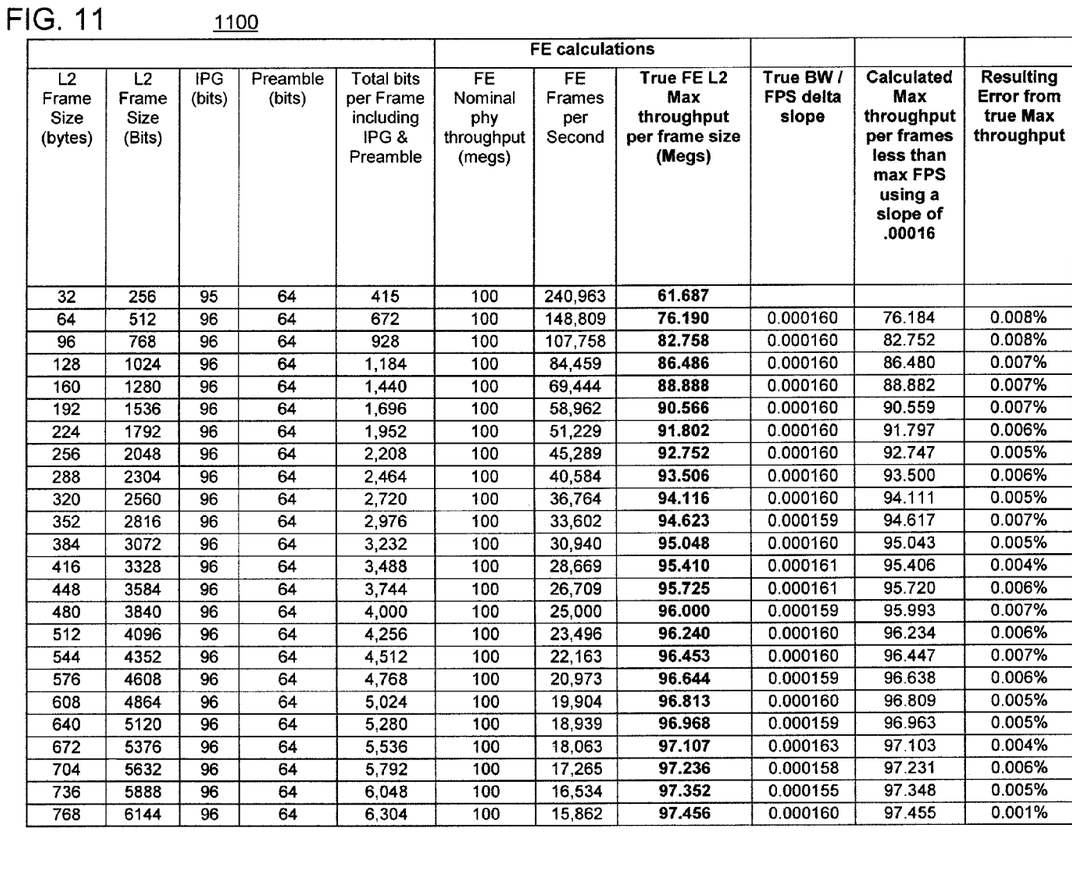

Example 1 and 2 provided below provide more specific examples of implementation of the logic 910 and 912 (sample values for each parameter are also illustrated in FIGS. 10 and 11).

EXAMPLE 1

For a nominal port speed (100 Mb for a fast Ethernet port)

$$MDT_{FPS} \leq MTUTP_{max} - [(FPS_c - FPS_{MMTU})*OHB]$$

$MDT_{FPS}$=Maximum Dynamic throughput in Frames per Second $MTUTP_{max}$=Max. MTU Size maximum Effective throughput $FPS_c$=Current Frames per Second (during a time interval that the throughput is checked)

$FPS_{MMTU}$=Max MTU size, Max. Frames per Second (highest rate they can be sent)

OHB=bits of Overhead introduced with each frame (taken away from max effective throughput).

EXAMPLE 2

For Ethernet one embodiment works as follows:

$$MDT_{FPS} \leq MTUTP_{max} - [(FPS_c - FPS_{MMTU})*OHB]$$

For a Fast Ethernet Port/or 100 Megabit Ethernet Service with a Maximum frame size (MTU) of 1518 bytes.

$MDT_{FPS}$=Max. achievable bandwidth at that # of frames
$MTUTP_m$=99.80 Megabytes
$FPS_c$=X−current interval # of frames
$FPS_{MMTU}$=8,127
OHB=0.00016
$MDT_{FPS} \leq 98 - [(FPS_c - 8,127)*0.00016]$ Reference to frame size or packet size may refer to an average value that is calculated for a time period or amount of data with the calculations being adjusted. The average value for packet or frame size may also be rounded up or down as needed to meet communications standards and protocols.

FIGS. 10 and 11 are pictorial representation of bandwidth tables 1000 and 1100 in accordance with illustrative embodiments. The bandwidth tables 1000 and 1100 provide examples of data that affect the bandwidth at a UNI or within a network as influenced by frame size, as described herein. In one embodiment, the tables 1000 and 1100 may be stored in electronic form in a UNI or in a database in order to determine compliance with an SLA. For example, compliance with the SLA may be determined dynamically utilizing the thresholds, ranges, values, and factors included in or dervied from the bandwidth tables 1000 and 1100.

The previous detailed description is of a small number of embodiments for implementing the invention and is not intended to be limiting in scope. The following claims set forth a number of the embodiments of the invention disclosed with greater particularity.

What is claimed is:

1. A method for controlling maximum throughput for communications, the method comprising:
   determining a frame size of each packet communicated to a user network interface (UNI);
   determining a maximum throughput in response to the determined frame size of each packet and a minimum and maximum transmission unit size associated with the frame size communicated to the UNI;
   measuring frames per second at the UNI;
   determining an amount of loss at the UNI if any; and
   communicating a message indicating the maximum throughput, the amount of loss, and the frames per second in response to determining there is loss at the UNI.

2. The method of claim 1, wherein the loss is acceptable and an service level agreement (SLA) is considered to be compliant in response to determining that loss occurs and the frames per second are greater than the maximum throughput, wherein the maximum throughput is a plurality of thresholds determined in response to the frame size of each packet utilized by a network communicating with the UNI.

3. The method of claim 1, wherein the packets represent test packets.

4. The method of claim 1, determining a service level agreement (SLA) is violated in response to less than a percentage of a total amount of available bandwidth being utilized and determining there is loss.

5. The method according to claim 1, further comprising:
   dynamically determining compliance with the service level agreement (SLA) in response to thresholds associated with frame size;
   reporting compliance with the SLA in the message, reporting further comprising storing network conditions at UNI at the time of the loss.

6. The method according to claim 5, further comprising:
   wherein dynamically determining compliance is performed utilizing a table relating the frame size and a port speed to the maximum throughput in terms of frames per second.

7. The method according to claim 1, further comprising:
   communicating service level agreement (SLA) compliance in the message, the SLA including a throughput range associated with potential frame sizes communicated through the UNI.

8. The method according to claim 1, further comprising:
   rate limiting the packets communicated to the UNI in response to exceeding the maximum throughput.

9. The method according to claim 8, further comprising:
   limiting communication of the packets sent from the UNI in response to exceeding the maximum throughput.

10. The method according to claim 1, wherein the measuring and multiple determining steps are performed by one or more counters.

11. The method according to claim 1, wherein the determining the maximum throughput further comprises:
utilizing clock skew and inter-frame gap to measure the maximum throughput.

12. The method according to claim 11, wherein the message includes an alarm generated in response to violation of a service level agreement (SLA).

13. A system for controlling communications based on a maximum throughput, the system comprising:
a UNI operable to communicate with a plurality of UNIs;
a network operable to communicate packets between the UNI and the plurality of UNIs; and
wherein the UNI includes performance logic operable to:
determine an average frame size of packets communicated to a UNI;
determine the maximum throughput in response to the determined average frame size of packets communicated to the UNI and utilizing a minimum and maximum transmission unit size;
measure frames per second at the UNI;
determine an amount of loss at the UNI; and
communicate a message to one or more users indicating the maximum throughput and compliance with a service level agreement (SLA) in response to detecting loss at the UNI.

14. The system according to claim 13, further comprising:
a rate limiter for shaping packet traffic, the rate limiter limiting the packets communicated to the UNI in response to the maximum throughput.

15. The system according to claim 13, wherein the performance logic dynamically determines compliance with an SLA utilizing a plurality of thresholds for throughput associated with frame sizes utilized by the network.

16. The system according to claim 15, wherein the frame loss is acceptable and an SLA is considered to be compliant in response to determining that frame loss occurs and the UNI frames per second are greater than the maximum throughput, the message including frame size information, the amount of loss, and the frames per second.

17. A UNI operable to regulate communications utilizing a maximum throughput comprising:
a processor for executing a set of instructions; and
a memory in communication with the processor, the memory operable to store the set of instructions, wherein the set of instructions are executed to:
determine an average frame size of packets communicated to a user network interface (UNI);
determine the maximum throughput in response to the determined average frame size of packets and associated minimum and maximum transmission unit size communicated to the UNI;
measure frames per second at the user network interface (UNI);
determine an amount of loss at the UNI; and
communicate a message to one or more users indicating the maximum throughput, the average frame size of the packets, the amount of loss, and the frames per second in response to determining there is loss.

18. The UNI according to claim 17, wherein the loss is acceptable and a service level agreement (SLA) is considered to be compliant in response to determining that loss occurs and a measured throughput is greater than the maximum throughput.

19. The UNI according to claim 17, further comprising:
dynamically determining compliance with the SLA utilizing thresholds associated with frame sizes, the compliance with the SLA being reported in the message and stored in one or more databases.

20. The UNI according to claim 19, wherein the determining is performed utilizing a table relating the frame size and port speed to the maximum throughput in terms of frames per second.

* * * * *